(No Model.)

G. A. & D. R. STEDMAN.
PIPE OR HOSE COUPLING.

No. 456,295. Patented July 21, 1891.

INVENTORS.
George A. Stedman,
David R. Stedman,

WITNESSES:

By Henry Connett
Attorney.

UNITED STATES PATENT OFFICE.

GEORGE A. STEDMAN, OF NEW YORK, N. Y., AND DAVID R. STEDMAN, OF ELIZABETH, NEW JERSEY, ASSIGNORS TO THE LEES MANUFACTURING COMPANY.

PIPE OR HOSE COUPLING.

SPECIFICATION forming part of Letters Patent No. 456,295, dated July 21, 1891.

Application filed December 18, 1890. Serial No. 375,076. (No model.)

*To all whom it may concern:*

Be it known that we, GEORGE A. STEDMAN, residing in the city, county, and State of New York, and DAVID R. STEDMAN, residing in Elizabeth, Union county, New Jersey, both citizens of the United States, have invented certain Improvements in Pipe or Hose Couplings, of which the following is a specification.

Our invention relates to that class of couplings wherein the sections of hose or pipes to be coupled each carries a member of the coupling and the coupling together is effected without the aid of screws; and the object of the invention is to provide a coupling which may be manipulated quickly by any one, no matter how inexperienced he may be, and one which will be perfectly tight under all ordinary conditions.

Our invention will be fully described hereinafter, and its novel features carefully defined in the claims.

Figure 1:
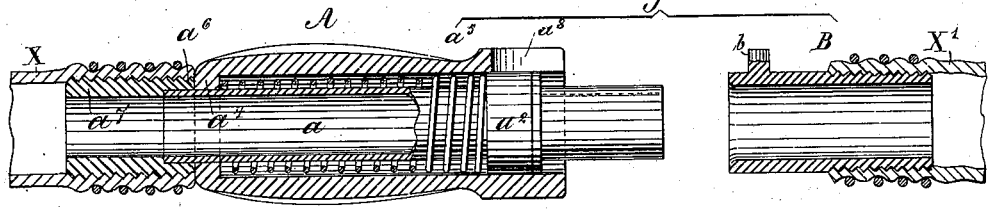
Figure 2:
Figure 3:
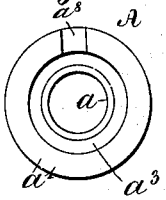
Figure 4:
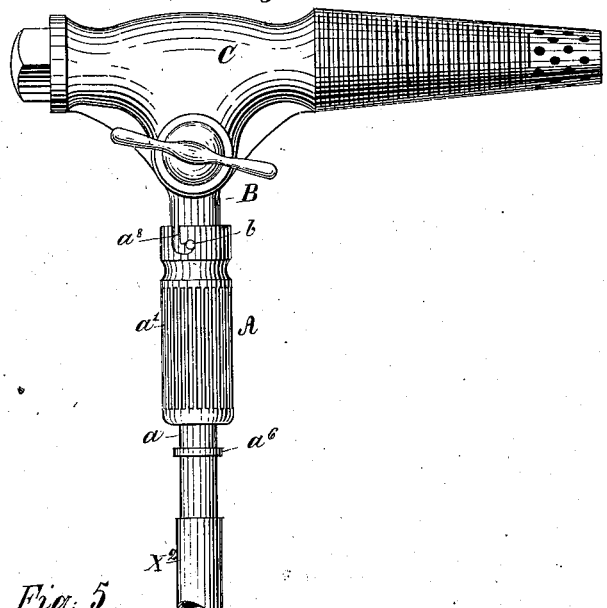
Figure 5:
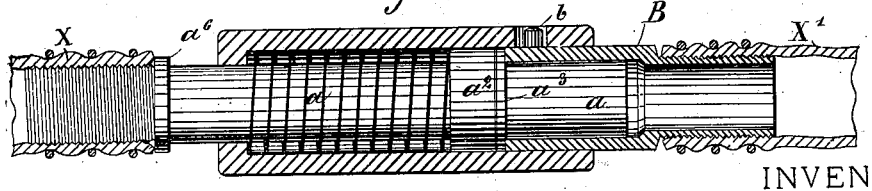

In the accompanying drawings, Figure 1 is a longitudinal section of a hose-coupling embodying our improvements. This view shows the two members detached. Fig. 2 is an elevation of the coupling, showing the members locked or coupled together. Fig. 3 is an end view of the major member of the coupling. Fig. 4 is a view illustrating the application of our coupling to the coupling of an ale or beer faucet to a pipe. Fig. 5 is a sectional view of a modification.

Although we have herein shown only two applications of our coupling, it is equally well adapted for coupling pipes or hose together and for coupling pipes or hose to nipples and nozzles of all kinds.

Referring primarily to the first three figures, A is the major member of the coupling as a whole, and B is the minor member. The major member comprises a tube $a$, to which is secured one section of hose X. This tube $a$ extends through a tubular casing $a'$, which is capable of rotating on the tube. On the tube $a$ is a collar $a^2$, which fits the bore of the casing $a'$ in the manner of a piston, and is provided with a packing-ring $a^3$ on its outer face, of rubber or similar soft packing material. The tube $a$ has a bearing at $a^4$ in the rear closed end of the tubular casing, and the collar $a^2$ forms a second bearing for the tube and keeps the latter centrally situated in the bore of the casing. Within the bore of the casing and embracing the tube $a$ is a coiled spring $a^5$, which abuts at one end against the shoulder at the rear end of the casing and at the other against the inner face of the collar $a^2$. This spring tends to drive the tube toward the open end or mouth of the casing; but a limiting-shoulder $a^6$, formed on the tube, seats itself against the rear end of the casing and keeps the spring under some tension. The shoulder $a^6$ is formed by securing to the tube $a$ a grooved or roughened nipple $a^7$, to which the hose X is secured. In the casing $a'$, at its open end, is formed an L-shaped slot $a^8$, the form of which is best seen in Fig. 2.

The inferior member B is in the form of a short section of pipe, to which is secured a section of hose X'. The internal diameter of the member B is the same as the external diameter of the tube $a$, and the external diameter of said member is the same as the diameter of the bore in casing $a'$, whereby said member may be slipped over the end of the tube $a$, which extends beyond the collar $a^2$ and projects from the open end of the casing, and is made to enter the latter. On the member B is a stud or projection $b$.

Fig. 1 shows the members separated and in their normal condition. To effect the coupling, it is only necessary to bring the two members together, pushing the inferior member over the extremity of tube $a$ until its end bears on and against the packing-ring $a^3$, the stud $b$ entering the slot $a^8$. The members are now pushed together as far as the slot will permit, the collar $a^2$ yielding and compressing the spring $a^5$ behind it. The casing $a'$ is now turned with the hand until the stud $b$ engages the lateral branch of the slot, as seen in Fig. 2. This locks the members together. The spring keeps the packing pressed up tightly against the member B and forms a tight joint. The members may be instantly disengaged or uncoupled by reversing this operation.

To prevent dirt from getting into the interior of the casing through the slot $a^8$, the piston-like collar $a^2$ is made wide enough to cover the slot and is arranged to stand in position to cover and close the slot normally, as seen in Fig. 1.

The inferior member B may be a pipe or a nipple, as it is merely a plain tube provided with a locking-stud. In Fig. 4 we have shown the application of our coupling to the nipple of a faucet. In this figure C is a faucet of an ordinary kind, of which the outlet-nipple forms the inferior member B of the coupling. In this view a metal pipe or tube $X^2$ replaces the hose X of Figs. 1 and 2. In other respects the coupling is the same as that before described.

Fig. 5 is a view illustrating a slight modification. In this case the hose X is attached directly to the tube $a$, and the member B is reduced in size to receive the hose $X'$. By this construction hose of smaller diameter or having an internal diameter nearly the same as that of tube $a$ may be coupled together. This view serves to illustrate the interior construction when the two elements are coupled or locked together. The casing $a'$ may be roughened exteriorly, in order to prevent the hand from slipping. It may have any convenient form exteriorly.

Having thus described our invention, we claim—

1. In a coupling, the combination of a tube $a$, having fixed on it a collar $a^2$, with a packing $a^3$ on its face, a tubular member B, adapted to fit over the tube $a$, with its end abutting against said packing, a sliding casing on the tube $a$, a spring arranged between the collar $a^2$ and some part of said casing, and reciprocal fastenings on the said casing and the member B, substantially as set forth.

2. In a coupling, the combination, with a tube $a$, having fixed on it a limiting-shoulder $a^6$ and a collar $a^2$, the latter having on its outer face a packing $a^3$, of a tubular member B, adapted to fit over the tube $a$, with its end abutting against the packing $a^3$, a sliding casing on the tube $a$, having a bore in which the collar $a^2$ fits, a spring $a^5$ within said casing and embracing the tube $a$, said spring abutting at one end against the collar $a^2$ and at its other end against some part of said casing, and reciprocal fastenings on the said casing and the member B, the limiting-shoulder $a^6$ being exterior to the casing, substantially as set forth.

In witness whereof we have hereunto signed our names in the presence of two subscribing witnesses.

GEORGE A. STEDMAN.
DAVID R. STEDMAN.

Witnesses:
ARTHUR FITCH,
THEODORE F. LEES.